Patented June 4, 1935

2,004,030

UNITED STATES PATENT OFFICE 2,004,030

COLLOIDAL INORGANIC BONDING COMPOSITION

Willis A. Boughton, Cambridge, Mass., assignor to New England Mica Co., Waltham, Mass., a corporation of Massachusetts No Drawing. Original application June 22, 1931, Serial No. 546,153. Divided and this application April 5, 1934, Serial No. 719,233

15 Claims. (Cl. 134—23.1)

This invention relates to an improvement in the art of bonding, binding, or cementing non-reacting and non-dissolving surfaces, and thereintegrating separate fragments, pieces, particles, films, layers, threads and fibers, into what are substantially unitary bodies.

This application is a division of my application, General processes of bonding, filed June 22, 1931, Serial No. 546,153, (Patent 1,975,079).

In the following description and discussion of the several inventions disclosed herein, reference is made specifically to its relation to the manufacture of laminated and other mica and insulating products; however, it should be understood that the application of the properties, principles, and methods disclosed herein may be made to other uses and materials, such as in the manufacture of adhesives, molded articles, lutes, etc., and such applications are included as among these inventions; other applications of the inventions will be obvious to those skilled in fields where the inventions may be applied. The description and claims herein are intended to include the above, and also other fields of usefulness without constant reference to them here in detail in view of my recognition of the general broad value of the inventions, and of my understanding and application of the principles involved and because of the impracticability of listing all of such applications in detail in this specification.

An object of the invention is to provide an inorganic binder for a great variety of products, which shall be highly adhesive, and shall be substantially unaffected by organic liquids or vapors at any temperature; and shall be water soluble to promote easy removal when desired; non-charring, non-combustible, fire-proofing, of low cost, free from risks of a sanitary nature during manufacture and use; of high dielectric strength, and capable of retaining these and other valuable properties at temperature above those at which the generally used bonding materials if organic, char or burn, and if inorganic, intumesce or decompose with the destruction of binding quality.

A further object relates to the preparation of inorganic lutes and cements, which shall be reversibly thermoplastic, soluble in water, and insoluble in organic liquids and vapors.

A further object is the production of a variety of electrically insulating products which do not char or carbonize at elevated temperatures, and that may be produced in a variety of shapes, and that are of low cost.

Further objects of the invention will be apparent to those skilled in the various mechanical arts after reading the specification.

Heretofore, adhesives, binders, and bonding materials of the kinds which have been applied to many modern arts not of a ceramic nature have been composed exclusively of organic substances, such as resins and gums. Because they are organic, such materials have a limited temperature range of usefulness. Their application often requires the employment of expensive binders, solvents, etc., and may constitute an actual hazard from fire, poisoning, etc.

For example the low temperature mica sheet of commerce heretofore ordinarily obtained is composed of pieces, films, flakes, etc., of split mica cemented together with an organic binder such as a natural or synthetic resin, or a composition comprising a resinous or glue-like adhesive. Integration of such films, flakes, etc., by such resin, is secured by rolling, pressing, etc., under a variety of conditions. Such a mica sheet is firm, has a moderate to high dielectric strength, is capable in its several forms of being punched, molded, made flexible, made rigid, etc. But such a mica sheet has several obvious disadvantages as follows:—First, because of the organic nature of the binder it cannot resist the action of heat above its charring point, and when subjected to temperatures higher than, say, 200° C. it carbonizes, de-laminates and disintegrates; or the binder may volatilize leaving the mica pieces in non-adhesive contact. Under conditions of careless use or over-heating such an organic-bound sheet gives off objectionable fumes, and may actually take fire, and thus constitute a real fire risk. Second, the binder, being organic deteriorates in the presence of oils, organic solvents, and similar corroding organic materials, sheets so bound suffer slow or rapid delamination in contact with such organic materials. Third, organic-bound laminated mica sheets usually if not invariably show a marked decrease in electrical puncture resistance with increase in temperature. Fourth, the more useful natural and synthetic resins are expensive, and the cost of the sheet is correspondingly high. Fifth, the process of manufacture usually involves the use of an organic solvent in which the binding resin is distributed to permit cementing one layer of mica pieces to another; and this solvent is an expense, as is its recovery for use again, and may also constitute a sanitary hazard in the factory.

These objections also apply in general to the use of organic binder and stiffeners used for various other purposes. It has seemed highly desirable, therefore, to replace such organic binders and bonding materials in part or in whole, with others that do not exhibit the disadvantages cited above. The search for satisfactory substitutes has, however, been hampered if not completely prevented by the stubborn belief, practically universally held, that inorganic materials are invariably crystalline or earth-like, non-adhesive, non-thermoplastic, and lack entirely the possibility of furnishing substances having properties suitable for adaptation to the above mentioned processes and products.

After considerable research with various inorganic materials, I have discovered that a very limited variety of chemical substances may be used as the chief solid constituents of a series of inorganic binders and bonding materials, adhesives, thermoplastics, etc., not only for laminated and other mica products, but for molded compositions of various kinds, adhesives, stiffeners, thermoplastics, lutes, etc. These few inorganic materials play the same part in the inorganic binder as the resin constituents, for example, plays in the usual organic binder. The solvent, instead of being an organic liquid, is water or an aqueous inorganic solution.

These substances include such compounds as sodium metaphosphate, $NaPO_3$; glacial phosphoric acid, $HPO_3$; sodium monoborate, $NaBO_2$; other alkali metaphosphates and monoborates such as the respective ammonium, lithium, and potassium compounds; also a few other chemically related compounds; also a variety of salts of the element beryllium. These are all characterized by the property of forming highly viscous aqueous solutions in concentrations, in the neighborhood of fifty percent, the viscosity usually being greater than that of glycerine and often as great as that of asphalt, or practically solid, depending on the amount of water in colloidal association with the salt molecule. These substances hold tenaciously to their colloidally attached water, as described below, yielding it up only slowly at temperatures considerably above the normal boiling point of a concentrated aqueous salt solution. Definite analyses are difficult to obtain because of the abnormal physical nature of such substances, but I have found that there is still residual water associated with them at temperatures upwards of 150° C. In general, the smaller amount of water associated with such an anomalous inorganic substance, the higher its viscosity at ordinary temperatures. The facts of the colloidality and viscosity of aqueous associations of the substances specified appear in the chemical literature, but I have discovered that a small proportion of the known inorganic substances capable of forming viscous aqueous associations are also capable of being made adhesive and bonding, obviously a totally different quality and not in any sense a necessarily inherent property of an inorganic viscous association with water. Thus as examples of non-adhesive viscous liquids I may cite concentrated sulfuric acid and orthophosphoric acid, both of which are markedly viscous, having however no binding properties. Similarly a super-cooled supersaturated solution of calcium nitrate, or magnesium nitrate, is a viscous liquid (although this fact is not recorded in chemical literature to the best of my knowledge) but neither is a bonding liquid as are the aqueous associations claimed in this invention. I desire to make the distinction clear between the property of viscosity in aqueous association and the exhibition of bonding power, the latter not being necessarily inherent in the substance but is developed as a result of treatment, or operation under limited conditions.

For example sodium metaphosphate is known to exist in several polymeric forms. To develop in it the bonding property utilized in this invention I form an aqueous solution of the glassy hexapolymer at a temperature below the boiling point of water and as rapidly as possible. The common commercial powdered sodium metaphosphate cannot be so used until after fusion when it is transformed to the glassy hexa salt. Similarly crystalline sodium monoborate is an aqueous association, but a non-useful form, in the sense of this invention. An aqueous solution if dilute shows no unusual viscosity and if concentrated crystallizes on cooling and standing, again being useless for this invention. Only when of a correct intermediate concentration and heated under pressure does it become a bonding material of desirable properties. The bonding property is therefore not necessarily an inherent property but one that may be developed as the result of treatment or of careful control of conditions and as such constitutes an invention.

To resume, in very definite ways the inorganic materials I have developed as described herein, have the properties and uses that have heretofore been associated solely with substances of organic nature, such as resins, oils, greases, adhesives, and other bonding materials. To the best of my knowledge these analogies of properties and uses have not previously been recognized and utilized, and it has not been previously known that the inorganic substances herein described may replace the above-mentioned organic materials in a number of arts and processes with improvement in the products especially with respect to increased temperature ranges of usefulness, complete resistance to fire, far less danger to the health of workers employed in the various processes of manufacture because of elimination of poisonous organic binder materials and solvents, and greater cheapness of materials used and manufacturing processes.

As indicated above these inorganic materials in general include those which may under suitable treatment or conditions form highly viscous aqueous solutions, or bodies, which are non-crystalline and bonding, and may be colloidal or colloid-like in nature, or at least resemble organic colloids in many properties. They yield their water content with increasing slowness at temperatures well above the normal boiling points of most aqueous inorganic solutions. When subjected to further heat they continue to yield residual water with increasing difficulty, are usually highly viscous liquids, and even though some pass through a crystalline, hard or dry stage, traces of water are retained up to the actual fusing of the material, which frequently is above low red heat. In the viscously fluid state these substances have been found to be binders for a variety of materials, and when the adhesion of binder and bonded surface is effected under pressure integration is attained, often at temperatures up to the fusion point of the anhydrous binder, and a product is obtained that retains its useful properties up to approximately the temperature of original manufacture.

I have found that it is possible and practicable to prepare compositions that, while solid at ordinary temperatures, become viscously fluid at practically any desired elevated temperature, and so may constitute binding fluids at these respective higher temperatures, yielding products of a controllable solidity at ordinary and elevated temperatures, up to the chosen temperature of fluidity of the binder. All of these non-crystalline and bonding inorganic bodies are reversibly thermoplastic.

I wish to be clearly understood that I recognize and make use in this invention of the principle stated in the Dawes and Boughton Patent 1,578,812, covering mica products, to the effect that certain inorganic substances show the characteristic of fluidly flowing at lower temperatures under high pressure than at ordinary pressure; however, the present invention is in part an improvement over the invention in the Patent 1,578,812, in that I utilize this principle in causing certain inorganic materials associated with appreciable amounts of water to flow under high pressure and bond associated surfaces together when at ordinary pressures no such bonding could be obtained because of the inhomogeneity of the binding material. As stated in the above cited patent, temperature and non-hydrostatic pressure are to be considered as interchangeable factors to a limited but definite extent, in affecting the flowing point of the compositions of matter therein cited, but in the present invention temperature alone may induce intumescence and solid formation, while pressure acts to restrain this property.

While I have cited a few typical substances showing these properties, I do not limit myself to these particular examples. Others will be evident to anyone familiar with the chemistry of such inorganic compounds and with the rheology of inorganic compositions.

It is essential also to recognize that substances of the nature cited here do not necessarily resemble each other closely in common ways, nor indeed in the herein described properties of high viscosity and colloidality and the developed property of bonding. For example, an aqueous solution of sodium metaphosphate is acidic, while that of sodium monoborate is alkaline. Sodium metaphosphate in the common commercial form of a white powder is practically insoluble in water. The solution I employ must be prepared under the stated condition from the fused sodium metaphosphate glass called Graham's salt, and when heated under certain conditions depolymerizes to an insoluble, crystalline non-viscous and non-adhesive form; while sodium monoborate may crystallize at ordinary temperatures when in concentrated solution. In both cases, however, crystallization can be restrained by suitable means, for example, by the application of selective pressures, and the range of temperatures over which these substances function as viscous fluids is thus considerably increased. Metaphosphoric acid $HPO_3$, ordinarily shows no particular tendency to crystallize as the water of colloidality is driven off, but appears to pass smoothly from the viscous aqueous solution to the viscous molten glass which is substantially free from colloidal water, yet when metaphosphoric acid is kept fused at high temperature for a period of hours it becomes almost insoluble in water. Other alkaline metal metaphosphates and monoborates may be made to form similar highly viscous solutions, but each has its own characteristics of temperature, crystallization, electrical resistance when dry, hygroscopicity, etc. Also, beryllium sulfate $BeSO_4$, especially in the presence of a slight excess of oxide or carbonate, can be treated in such a way as to form a useful viscous solution of excellent properties of adhesion, electrical resistance when dry, etc. Many other beryllium compounds act similarly. In its particular field each acid, or salt, or a mixture of salts, etc., is useful for the purpose herein cited or operates usefully over some particular range of conditions.

Suitable combinations of such substances yield properties which in general are additive; as in the case of the analogous organic materials. Thus a viscous aqueous solution of sodium metaphosphate is a better electrical conductor than one of sodium monoborate, and the conductivity of a mixture of these two substances is substantially an average between the two individual conductivities.

Furthermore sodium metaphosphate in the crystalline form, when heated to still higher temperatures fuses again to form a viscous glassy liquid which is the polymerized "Graham's salt"; and at these temperatures it is again an adhesive for such substances as mica pieces.

These various collective and individual properties are fully taken advantage of in the several applications of my invention as described. By a suitable selection and combination of the simple chemical substances of the class described, with or without admixture of other substances in minor amounts, it has been possible to prepare laminated mica sheets, for example, with varied properties, at will, to suit the special needs of industry and commerce, in great variety. These may be made to operate with high satisfaction in their respective fields up to temperatures considerably higher than the maximum temperatures at which the corresponding organic-bound mica sheets may be employed with safety and in a more limited way sheets can be prepared to operate satisfactorily up to the temperature of manufacture even though that approaches the decomposition temperature of mica itself.

As compared with organic-bound mica sheets, those made with my inorganic binders show extraordinary advantages. The process of manufacture itself is simpler, cheaper, and safer from the standpoint of sanitation and fire risk. Thus, the solid binder constituents are usually cheaper than the resins used for organic-bound plates, the actual manufacture of the inorganic plate is simpler, and the solvent is inorganic, for example water, or an aqueous solution of an appropriate salt, instead of usually an inflammable and poisonous organic liquid. Into their manufacture, therefore, no such risks and hazards and discomforts enter as in the case of organic-bound mica sheet. The sheets formed are oil insoluble, non-charring, non-burning, and, in the more highly dehydrated forms, of superior electrical resistance.

It is obvious, of course, that the properties and advantages cited above in the case of laminated products also apply to these viscous inorganic materials when used in other ways, for example, as cementitious materials to be used with various fillers for the preparation of plastics, for lubricants and lutes, for adhesives between surfaces other than mica, such as of cellulosic materials, textiles, metals, etc., for surfacing to withstand the action of organic vapors, liquids and solids, as forms of disinfectants in the case of the metaborate mixtures, and for many other purposes that will be entirely obvious to those to whom the properties of these substances are familiar.

Typical formulas, compositions of matter, and examples of use and application are as now follows:—

EXAMPLES

(1) Beryllium compounds

Beryllium sulfate as the article of commerce may be used or the salt may be prepared by any of the common chemical methods such as by neutralization of aqueous sulfuric acid with beryllium carbonate. Since a slight basicity of beryllium salts appears to restrain crystal formation and promote the development of viscous solution, it is desirable to add a slight excess of base. The solution is concentrated by evaporation or is diluted, as may be necessary to produce a liquid that contains 30% or less of solid beryllium sulfate, for application. More concentrated or more dilute solutions may of course be employed as the particular use requires. The solution when further dehydrated becomes increasingly viscous, until at the higher dehydration temperatures an intumescent solid is formed and the desirable condition of viscous liquidity is partly or wholly lost. The temperature at which this change takes place appears to vary with the pressure. When uncompressed, intumescent solid and viscous solution may exist in mutual contact at temperatures of 110–125°. Under pressure, however, the viscous adhesive condition persists to temperatures above 200° C.

Such a viscous liquid may be variously employed. In the manufacture of flexible mica sheet the concentration of the solution used depends upon the conditions of manufacture and the temperature at which useful flexibility is desired; and also upon the percentage of binder which the sheet is to possess. Thus for a sheet of useful flexibility at ordinary temperatures and of binder content less than 20%, a solution of 25–30% concentration may be employed. This solution is applied as in the manufacture of the organic-bound mica sheet of commerce. The sheet is then transferred to a hot table where it is rolled to effect thorough cementation of the pieces, to remove excess of binder and to dehydrate the liquid to the viscosity at which correct flexibility of the sheet is attained.

For storage, such a flexible sheet may be protected against further spontaneous dehydration and consequent loss of flexibility by coating with a dry sealing composition, or by wrapping in waxed paper or other water-non-penetrating tissue, or in any other customary manner.

Such a sheet has all of the non-resilient flexibility of the highest quality of organic-bound flexible sheet. In addition it is not disintegrated by contact with oils and greases, a common fault with organic bound sheet; it does not char, burn, or give off fumes when subjected to higher temperatures. Its dielectric strength is 300–400 volts per mil, and this value rises when the sheet is dried out by heating, reaching values above 600 volts per mil, whereas organic-bound sheet suffers a gradual loss in electrical resistance when subject to elevated temperatures, (above about 150° C.).

At temperatures upwards of 110° C. the binder of the sheet in flexible form, if under even compression as in a manufactured article, further dehydrates and may eventually somewhat opacify, showing then, however, an increase in electrical resistance and a restraint of intumescence. When subjected to overheating sufficient to destroy an organic-bound plate, this will, under suitable conditions only improve the electrical resistance of the inorganic-bound sheet.

To produce a mica sheet to be flexible at, say 100° C., it is only necessary to carry further the dehydration of the common flexible mica sheet. Such a sheet (flexible at 100° C.) is stiff or only slightly flexible at ordinary temperatures. In other respects its properties are those described above. When such flexible sheet is heated to 200° C., for example, crystallization and intumescence would normally take place; however, under effective pressures from moderate pressures to upwards of 100–200 pounds per square inch, crystallization and intumescence are avoided and a colorless, practically transparent sheet is produced having superior physical properties. The electrical resistance of such high pressure sheet, for example, is about 800 volts per mil, and at ordinary temperatures the sheet is highly integrated, tough and strong. At still higher temperatures and pressures of manufacture, sheets are formed that will retain the admirable properties cited above under conditions of rising temperature up to approximately the temperature of manufacture, or that of the complete dehydration of the binder compound.

Such a binder may obviously be used as a plastic, constituting the binding factor of a plastic, luting, or lubricating composition containing a powdered or fibrous filler such as talc, lithopone, graphite, or powder of similar non-reacting kind, or asbestos, or cellulosic fiber, etc. When heated under pressure with loss of solvent such a mass furnishes a moldable product adapted to many needs.

Other uses and applications will be entirely apparent to those familiar with the various arts.

(2) Sodium metaphosphate

This substance formerly a chemical curiosity is now an article of commerce. It is known to exist in several polymerized forms. For the purposes herein cited I use the form called Graham's salt or hexametaphosphate, of the reputed formula $(NaPO_3)_6$, although I may effect transformation of this form to yield one or more other forms. Graham's salt is a glass which is soluble in water, forming an acid solution which may be prepared in desired concentrations by powdering the glass and mixing the powder rapidly with the correct amount of water, or preferably by placing the glass in a vessel containing less water than required, effecting rapid solution by warming and violent agitation, and diluting the resulting liquid with more water until the desired concentration is reached. Such a highly concentrated solution has apparently not been known by others because the usual way of increasing concentration, namely, by application of heat, results in depolymerization and crystallization of the solution. For making mica sheets the concentration may be 15% or less. For lubrication, making molded products, lutes, etc., the concentration may be greater than 60%.

The differences in viscosities between various concentrations of such compounds is striking. The 15% solution is less viscous than glycerine, while the 60% solution is as viscous as a heavy, slow flowing tar. Solutions of ammonium metaphosphate or metaphosphoric acid may be prepared which are so viscous as to be essentially solid at ordinary temperatures.

When an aqueous solution of sodium metaphosphate is boiled it becomes more concentrated and the boiling temperature rises; at 110–130° C., depolymerization partly or wholly takes place and fine, white, water-insoluble crystals appear in the viscous liquid, or the entire liquid becomes crystallized and solidifies to a cake.

In the manufacture of mica sheet and other products I take advantage of this peculiar property as follows:—The sheet is prepared in flexible form as described above. As such the dielectric strength is in the vicinity of 100 volts per mil, a low value, but when the flexible sheet is dehydrated by heat (at about 110° C. to 130° C.) depolymerization takes place, the sheet opacifies and hardens by crystal formation and the dielectric strength rises to about 400 volts per mil. The sheet thus formed is hard and non-flexible without completely losing its firmness. As the temperature is further increased the electrical resistance rises slowly and the sheet retains its rigidity to a temperature of 400° C. or so when residual water is given off, the crystals sinter, and in the neighborhood of 500° C., fuse to form a viscous adhesive fluid of substantially anhydrous sodium metaphosphate that again furnishes a binder for mica films, but in this stage, with good electrical resistance continuing as such up to the decomposition temperature of mica itself.

Tubes of practically any desired diameter and wall thickness may be prepared by rolling the low temperature flexible mica sheet, bound with this or other inorganic binder, or mixtures of such binders, cementing the layers together with more binder. These show the expected properties of hardening at temperatures above about 110° C., and then becoming electrical insulators with superior properties, remaining useful as supports for resistance wire and ribbon, and for other purposes up to high temperatures as described above. Such tubes may be heated above the fusion point of the binder whereupon they acquire the improvement in electrical and physical properties indicated above when the binder is fused.

The crystallization and hardening of the sodium metaphosphate takes place even under pressure, unless restrained by suitable means; (see my application entitled "Method of restraining crystallization", filed June 22, 1931, Serial No. 546,154.

Sodium metaphosphate in admixture with certain other materials, as described separately, yields binders, lubricants, etc., that crystallize at much higher temperatures than is the case with the single substance, or remain continuously fluid up to the temperature of anhydrous fusion, yielding solid integrated products at respectively lower temperatures. In preparing such a mixed binder I may first dissolve the sodium metaphosphate as described and then add the other constituents or obviously I may prepare an aqueous solution of the other constituents and dissolve the sodium metaphosphate in it. Laminated mica sheets made with such binders when heated to temperatures upwards of 300° C. or under pressures of 100–200 pounds per square inch retain their clearness and are superior in physical properties to the best organic-bound sheets. They have the enormous additional advantages of showing no electrical breakdown at temperatures up to approximately the decomposition temperature of mica itself, and of course they do not char, smoke, or fume as do organic-bound sheets, or de-laminate at the same comparatively low temperature.

However, it must be noted that such an inorganic-bound sheet may under certain conditions, crystallize at some temperature above that of manufacture. Nevertheless, it is a general and broad rule that sheets may be prepared from selected formulas, at higher temperatures and pressures, that retain their clearness, integration and freedom from crystallization up to their respective temperatures of manufacture, even to approximately the decomposition temperature of mica itself. A few such formulas comprising sodium metaphosphate as the chief constituent, are as follows. The proportions given are parts of dry material by weight:—

(a) Sodium metaphosphate 20, sodium carbonate 8, potassium thiocyanate 2, secondary ammonium phosphate 2, sodium tungstate 2, ammonium molybdate 2. The mixture when applied as a solution to mica pieces as usual gives a clear colorless mica sheet of excellent adhesion and other physical properties, and when pressed at 180° C. loses a part of its water without crystallization, intumescence or opacification, and has then a dielectric strength of about 1000 volts per mil.

(b) Sodium metaphosphate 20, potassium carbonate 2.6, ammonium metaphosphate 2. Under the same conditions of manufacture as (a) this yields a mica sheet of equally superior properties and a dielectric strength of more than 900 volts per mil.

(c) Sodium metaphosphate 20, potassium dichromate 2. This formula yields a plate of excellent physical qualities and a dielectric strength of 500–600 volts per mil.

Mixtures of two or more alkali metal metaphosphates furnish similar superior compositions. The neutralization of the natural acidity of a solution of sodium metaphosphate with other alkali metal carbonates yield such mixtures. They may also be formed by addition of the respective metaphosphates formed by neutralization of metaphosphoric acid solution with the respective carbonates or hydroxides, and in the case of ammonium metaphosphate by addition of any of the orthophosphates, the latter salts readily decomposing at comparatively low temperatures to form the metaphosphate. Mixture (b) cited above is essentially a mixture of sodium, potassium, and ammonium metaphosphates, when the application of heat and pressure is completed.

It will at once be apparent that the various specific or developed properties of sodium metaphosphate both alone and in admixture with other salts may be applied to other uses than the manufacture of mica sheet and tube. I have discovered, for example, that the viscous solution when freely exposed to the air loses surface water with the formation of a dry film through which the water underneath escapes slowly, but eventually such a solution dries at ordinary temperatures to a hard, tough horny and glasslike mass. It is an excellent adhesive for a variety of materials. It is obviously of great value as a plastic base in the manufacture of molded products. Various other uses will also be apparent at once.

(3) Sodium monoborate

The aqueous solutions of this material show high viscosities, especially in the ranges of concentration above 35%, although for any concentration the viscosity of the monoborate solution is lower than that of the metaphosphate.

Nevertheless, these solutions when prepared under the conditions I employ can be made to show extraordinary bonding strength in thin layers.

The properties of commercial samples vary considerably in detail but all such samples tend to crystallize on standing at ordinary temperatures unless this is restrained by suitable means. Under ordinary pressures and at temperatures of about 110° to 130° C. solutions of sodium monoborate tend to dry out and intumesce very much as does crystallized borax. At higher pressures, upwards of 100 pounds to the square inch, however, viscosity is usually retained at temperatures higher than 180° C., especially when small quantities of crystallization restraining salts are present. The electrical resistance in all stages is usually greater than that of sodium metaphosphate. Thus in flexible form the dielectric strength of a monoborate bound mica sheet may run between 200 and 300 volts per mil. When the sheet is rolled at 110° C. the dielectric strength increased to more than 700 volts per mil; and when pressed at 180° C. dielectric strengths of approximately 1200 volts per mil have been customarily obtained. The mechanical and other properties of the sheets so obtained are of a high quality, equal to those of the best metaphosphate bound sheets and superior to those of organic-bound sheets.

When a monoborate bound sheet is heated in the open, above the temperature of its manufacture under pressure, the binder intends to intumesce and the sheet to de-laminate with consequent loss of many of its useful properties. As in the case of sodium metaphosphate the range of temperature over which the useful condition of transparent or translucent viscosity and developed binding property persists may, however, be increased by admixture with certain other kinds of inorganic substances as described elsewhere. Thus, the following mixtures comprising chiefly sodium monoborate have shown properties superior to those of this substance alone:—

1—Sodium monoborate 10, ammonium iodide 1.
2—Sodium monoborate 10, sodium pyrophosphate 1.
3—Sodium monoborate 10, ammonium nitrate 1.
4—Sodium monoborate 8, potassium phosphate 2, ammonium phosphate 1.

In other respects and in its various treatments and uses such as herein described are concerned, sodium monoborate resembles sodium metaphosphate.

Admixture of other monoborates should be done by preparation of the several monoborates separately, rather than by addition of carbonates, since sodium monoborate solution is alkaline. Such admixtures show an elevation of crystallization temperature analogous to that observed with the metaphosphates.

*Mixtures containing only metaphosphates and monoborates*

Essentially neutral mixtures of sodium metaphosphate, sodium monoborate and phosphoric acid furnish binding mixtures of excellent properties. One such mixture containing sodium metaphosphate 6, sodium monoborate 5, metaphosphoric acid 1, gave a dielectric strength of about 700 volts per mil.

Molded products shaped into a variety of forms may be made by mixing fragments of selected solids, for example, asbestos fibers, powdered mineral matter, etc., with desired quantities of any of the above cited bonding inorganic substances or mixtures thereof described herein, heating and pressing, and molding to the desired configuration, and allowing to cool. Such products are stiff and rigid, are not affected by the usual changes of weather and temperature, do not char or burn, and may be mechanically worked.

As a luting or cementing agent, the new compositions described herein have a wide field of application. They are all reversibly thermoplastic. Joints between two articles may be made by warming the substances to be joined, applying any of the viscous non-crystalline and bonding adhesive compositions or mixtures thereof, and where practicable, pressure may be applied; after cooling, the joint will be tight, resistant to all organic solvents and vapors, and will not char or burn by the application of heat.

It is apparent therefore, that recognition and utilization of the property of forming adhesive viscous aqueous solutions and compositions, and which upon concentration are non-crystalline, and which are capable of being developed into bonding compositions under a variety of conditions, and the discovery of the method of bringing about bonding and of increasing the useful ranges of temperature of the desirable properties as revealed herein, constitute an invention which is new, of a fundamental and basic nature, and of marked value in the several arts and industries.

I claim:

1. A bonding composition for discrete portions of solids, comprising a highly viscous colloidal inorganic substantially non-crystalline liquid adhesive mass, the bonding agent therein consisting of at least one compound selected from the group consisting of metaphosphoric acid radicle compounds, alkali metal monoborates, and beryllium sulphate, said composition containing from about thirty-five percent to about sixty percent of the said bonding agent, the balance of said composition being principally water colloidally associated with said bonding agent.

2. A bonding composition for discrete portions of solids, comprising a highly viscous colloidal inorganic substantially non-crystalline liquid adhesive mass, the bonding agent therein consisting of at least one compound selected from the group consisting of metaphosphoric acid radicle compounds, alkali metal monoborates, and beryllium sulphate, said composition containing from about thirty-five percent to about sixty percent of the said bonding agent, and controlled effective amounts of a blendable crystallization restraining agent, the balance of said composition being principally water colloidally associated with said bonding agent.

3. A bonding composition for discrete portions of solids, comprising a highly viscous colloidal inorganic substantially non-crystalline liquid adhesive mass, the bonding agent therein constituting from about thirty-five percent to about sixty percent of an alkali metal metaphosphoric acid compound, the balance of said composition being principally water colloidally associated with said metaphosphoric acid compound.

4. A bonding composition for discrete portions of solids, comprising a highly viscous colloidal inorganic substantially non-crystalline liquid adhesive mass, the bonding agent therein constituting from about thirty-five percent to about sixty percent of an alkali metal metaphosphoric acid compound, and controlled effective amounts of a blendable crystallization restraining agent, the balance of said composition being principally water colloidally associated with said metaphosphoric acid compound.

5. A bonding composition for discrete portions of solids, comprising a highly viscous colloidal inorganic substantially non-crystalline liquid adhesive mass, the bonding agent therein constituting from about thirty-five percent to about sixty percent of sodium metaphosphate, the balance of said composition being principally water colloidally associated with said sodium metaphosphate.

6. A bonding composition for discrete portions of solids, comprising a highly viscous colloidal inorganic substantially non-crystalline liquid adhesive mass, the bonding agent therein constituting from about thirty-five percent to about sixty percent of sodium metaphosphate, and controlled effective amounts of a blendable crystallization restraining agent, the balance of said composition being principally water colloidally associated with said sodium metaphosphate.

7. A bonding composition for discrete portions of solids, comprising a highly viscous colloidal inorganic substantially non-crystalline liquid adhesive mass, the bonding agent therein constituting upwards of thirty-five percent of sodium monoborate, the balance of said composition being principally water colloidally associated with said sodium monoborate.

8. A bonding composition for discrete portions of solids, comprising a highly viscous colloidal inorganic substantially non-crystalline liquid adhesive mass, the bonding agent therein constituting upwards of thirty-five percent of sodium monoborate and controlled effective amounts of a blendable crystallization restraining agent, the balance of said composition being principally water colloidally associated with said sodium monoborate.

9. A bonding composition for discrete portions of solids, comprising a highly viscous colloidal inorganic substantially non-crystalline liquid adhesive mass, the bonding agent therein constituting upwards of thirty percent of beryllium sulphate, the balance of said composition being principally water colloidally associated with said beryllium sulphate.

10. A bonding composition for discrete portions of solids, comprising a highly viscous colloidal inorganic substantially non-crystalline liquid adhesive mass, the bonding agent therein constituting upwards of thirty percent of beryllium sulphate and controlled effective amounts of a blendable crystallization restraining agent, the balance of said composition being principally water colloidally associated with said beryllium sulphate.

11. A bonding composition for mica flakes, comprising a highly viscous colloidal inorganic substantially non-crystalline liquid adhesive mass, the bonding agent therein constituting from about thirty-five percent to about sixty percent of metaphosphoric acid radicle compound, and controlled effective amounts of a blendable crystallization restraining agent, the balance of said composition being principally water colloidally associated with said metaphosphoric acid radicle compound.

12. A bonding composition for mica flakes, comprising a highly viscous colloidal inorganic substantially non-crystalline liquid adhesive mass, the bonding agent therein constituting from about thirty-five percent to about sixty percent of an alkali metal metaphosphoric acid compound, and controlled effective amounts of a blendable crystallization restraining agent, the balance of said composition being principally water colloidally associated with said metaphosphoric acid compound.

13. A bonding composition for mica flakes, comprising a highly viscous colloidal inorganic substantially non-crystalline liquid adhesive mass, the bonding agent therein constituting from about thirty-five percent to about sixty percent of sodium metaphosphate, and controlled effective amounts of a blendable crystallization restraining agent, the balance of said composition being principally water colloidally associated with said sodium metaphosphate.

14. A bonding composition for mica flakes, comprising a highly viscous colloidal inorganic substantially non-crystalline liquid adhesive mass, the bonding agent therein constituting upwards of thirty-five percent of sodium monoborate, and controlled effective amounts of a blendable crystallization restraining agent, the balance of said composition being principally water colloidally associated with said sodium monoborate.

15. A bonding composition for mica flakes, comprising a highly viscous colloidal inorganic substantially non-crystalline liquid adhesive mass, the bonding agent therein constituting upwards of thirty percent of beryllium sulphate, and controlled effective amounts of a blendable crystallization restraining agent, the balance of said composition being principally water colloidally associated with said beryllium sulphate.

WILLIS A. BOUGHTON.